May 8, 1951  L. E. LA BRIE  2,552,048

TILTING VALVE MASTER CYLINDER

Filed July 9, 1947

INVENTOR.
LUDGER E. LA BRIE
BY Clifford C. Bradbury
ATTORNEY

Patented May 8, 1951

2,552,048

UNITED STATES PATENT OFFICE 2,552,048

TILTING VALVE MASTER CYLINDER

Ludger E. La Brie, Detroit, Mich., assignor to Hydraulic Brake Company, Detroit, Mich., a corporation of California Application July 9, 1947, Serial No. 759,839

6 Claims. (Cl. 60—54.6)

This invention relates to tilting valve master cylinders for hydraulic brake systems.

The principal object of the invention is to provide a cylinder which is free of openings along that part of the cylinder in which the piston operates, thereby removing the danger that the piston cup will be damaged in passing such an opening.

Another object of the invention is the arrangement by which fluid is supplied from the reservoir to the cylinder through a path which does not pass the piston cup washer, thus permitting the cup washer to be made of stiff rubber of a kind which will not feather out under high liquid pressure into the space between the metallic piston and the cylinder wall.

Another object of the invention is to provide a valve for the admission of fluid into the cylinder when, during the return stroke of the piston, the pressure within the cylinder becomes less than that in the reservoir, and means for tilting the valve on its seat to hold it open when the piston has returned to its normal position.

Another object of the invention is the provision of a thimble movable within the cylinder and having a flange which engages the stem of the valve to tilt it when the piston is in its normal position, and to permit the valve to seat when the piston is moved slightly from its normal position.

When the brake fluid and the rubber cup washer are suited to one another, almost no swelling of the cup washer takes place; but in use sometimes, brake fluid is added which is of a kind which is not suited to the cup washer so that swelling of the cup washer takes place. Another object of the invention is to provide a metallic or plastic insert in the piston cup washer which definitely locates the normal position of the valve tilting thimble regardless of expansion of the cup washer.

My invention is illustrated in the accompanying drawing, in which

Figure 1:
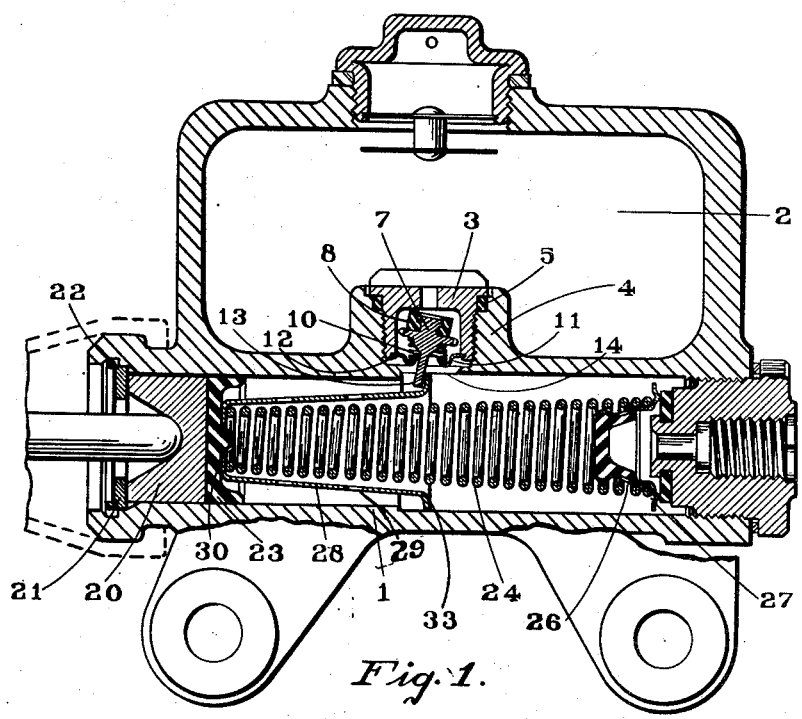
Fig. 1 is a vertical section through a hydraulic brake master cylinder and an associated reservoir.
Figure 2:
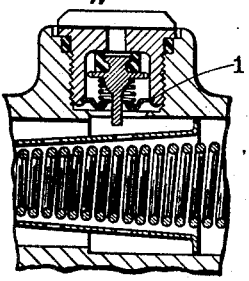
Fig. 2 is an illustration of the valve mechanism of Fig. 1 in its sealing position.

The cylinder 1 and reservoir 2 are preferably cast integrally, though the invention is applicable to a remote reservoir which may be connected to the valve seat member 3 by tubing. In the illustrated example of my invention, the valve seat member 3 is threaded into a boss 4 in the upper wall of the cylinder 1, a seal in the form of a rubber ring 5 serving to prevent leakage between the valve seat member 3 and the boss 4. A metallic valve 7 is located within the hollow portion of the valve seat member 3. The valve 7 is provided with a rubber facing 8 which is snapped around the head of the valve and extends slightly beyond the metallic portion of the valve which faces the valve seat. This rubber serves as the seal against the valve seat. It extends only slightly beyond the metallic part of the valve member 7 so that under high pressure, the valve member 7 will be pushed upwardly until the metal portion of the valve contacts the valve seat, though when only slight pressure is applied to the liquid in the cylinder, only the rubber member 8 contacts the valve seat. The valve 7 is retained in position by a very light spring 10 which rests upon a spider 11 staked into the lower end of the valve seat member 3 by upsetting the metal of the valve seat member at a plurality of spots as illustrated at 12. (Figs. 1 and 2.) The stem 13 of the valve 7 extends through an opening in the spider 11 and through an opening 14 in the upper wall of the cylinder, the stem being of such a length that it protrudes slightly into the bore of the cylinder.

The bore of the cylinder may be of two diameters so that it is not necessary to finish to a high polish any part of the cylinder excepting that in which the piston operates.

Figure 3:
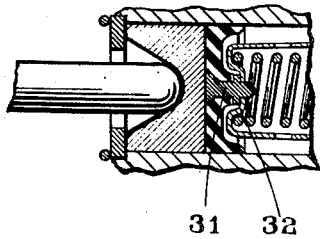
Fig. 3 is a modification of the cup washer and thimble base illustrated in Fig. 1, which permits swelling of the rubber of the cup washer without changing the normal position of the thimble and tilted valve.

A piston 20 normally abuts a stop washer 21 held in place by a C-spring 22. A cup washer 23 is held against the inner face of the piston by a spring 24 which serves also to return the piston to its normal position after a pressure operation. The valve mechanism at the discharge end of the cylinder permits fluid to escape from the cylinder through passages 26 and retards the return of fluid from the piston to the cylinder at the abutment 27. The spring 24, therefore, creates a suction or depression within the cylinder when the piston is released, this depression being sufficient to pull the valve 7 off its seat to permit replenishment of the fluid from the reservoir during the return stroke of the piston. The end of the spring adjacent the piston is seated within a thimble 28, perforated at 29, to provide free circulation of fluid, and guided at its piston end by a cup washer projection 30, which extends through an opening in the base of the thimble. In Fig. 3, a modification of this structure includes a metallic insert 31, having a shoulder 32, against which the base of the thimble 28 abuts. The open end of the thimble 28 is provided with a flange 33 having a diameter which permits it to slide freely within the larger portion of the cylinder 1. The thimble is of such length that this flange strikes the stem 13 of the metallic valve 7 when the spring pushes the piston to its normal position, thus tilting the valve and opening the passageway between the reservoir and the cylinder so that excess fluid which may have been drawn into the cylinder during the return stroke of the piston may now freely pass out of the cylinder into the reservoir. When expansion or contraction of fluid in the system takes place, fluid passes out from or into the cylinder past the normally tilted valve. If desired, the cylinder 1 may have a single diameter bore.

In the operation of this cylinder, the first movement of the piston on its pressure stroke permits the valve member 7 to straighten to the position shown in Fig. 2, thus closing the opening between the cylinder and the reservoir. Further movement of the piston on its pressure stroke may move the valve 7 upwardly until it abuts the inner face of the valve seat member 3, but in all events, the rubber member 8 of the valve constitutes the seal to prevent the escape of fluid from the cylinder into the reservoir. Upon the release of pressure on the piston 20, the spring 24 causes the piston 20 to move toward its normal position, and when the pressure of the returning fluid from the brake lines drops to near normal, the contact of the valve member 26 upon its seat creates an actual depression in the cylinder, which normally permits some brake fluid to flow into the cylinder past the valve 7 and rubber seal 8. When the piston 20 has returned to its normal position, the flange 33, on the thimble 28, strikes the stem 13, of the valve 7, and tilts the valve so that any excess of fluid which was drawn into the cylinder during the return stroke of the piston may now escape into the reservoir.

In the initial filling of the brake system with brake fluid, the two valves 7 and 26 serve as intake and discharge valves so that the reciprocation of the piston 20 in the cylinder 1 pumps fluid out of the reservoir and into the brake lines and brake operating motors so that air can be expelled from the system by opening bleeder valves at the motors.

Although I have shown and described my invention with respect to certain details of construction, some variations may be made from these details without departing from the spirit or scope of my invention.

I claim:

1. In a master cylinder for hydraulic brake systems, a reservoir for operating fluid, a piston in the cylinder, a spring in the cylinder for returning the piston to its normal position, there being a passageway from the reservoir into the cylinder beyond the pressure stroke of the piston, a valve opening toward the cylinder having a stem projecting into the cylinder, a thimble normally movable with the piston in the cylinder but separable from the piston under high fluid pressure and having a flange for engagement with the stem of the said valve to tilt the valve on its seat to open it when the piston and thimble are in their normal positions, a spring for the valve tending to hold it on its seat, the first movement of the piston on its pressure stroke moving the thimble flange out of contact with the valve stem permitting the valve to seat under influence of its spring.

2. In a combined master cylinder and reservoir, a piston in the cylinder, there being an opening between the reservoir and cylinder beyond the pressure stroke of the piston, a valve seating toward the reservoir for closing the opening during the pressure stroke of the piston, said valve having a stem protruding into the cylinder, a member normally movable with the piston but separable therefrom having a portion for engagement with said stem to tilt the valve and open it when the piston is in its normal position, a spring for the valve tending to close it, and a spring for the piston tending to return it to its normal position, the spring for the piston being of superior strength to that of the spring for the valve.

3. In a combined master cylinder and reservoir, a piston in the cylinder, there being an opening between the reservoir and cylinder beyond the pressure stroke of the piston, a cup washer for the piston having a central projection extending into the cylinder, a thimble abutting the cup washer having an opening in its end into which the central projection of the cup washer extends for centering the end of the thimble in the cylinder, a spring abutting the inner part of the thimble for forcing the cup washer and piston toward their normal positions, the thimble having a flange at its end remote from the piston, a tiltable valve having a stem extending into the cylinder in position to be engaged by the flange of said thimble when the thimble is forced to its normal position, said valve serving to close the opening between the reservoir and the cylinder when the valve is in its untilted position, and a spring for seating the valve.

4. In a combined master cylinder and reservoir, a piston in the cylinder, a valve for closing the fluid connection between said master cylinder and reservoir, said valve having a stem extending into the cylinder and being tiltable to open said fluid connection, and means in the cylinder normally moving with the piston for engaging said stem and holding said valve in its tilted position when the piston moves to its normal position and for permitting the valve to become untilted upon the commencement of the pressure stroke of the piston said means being separate from the piston thus permitting the piston to be removed from the cylinder when the movement of said means is stopped by engagement with said valve stem.

5. In a combined master cylinder and reservoir, a piston in the cylinder, a cup washer abutting the fluid side of the piston, a metallic stud extending through the cup washer and having an abutment within the cylinder, a thimble within the cylinder having its small end abutted and guided upon said stud, a spring within the thimble for forcing the piston to its normal position, a flange around the large end of the thimble, a valve for closing the opening between the reservoir and cylinder having a stem extending into the cylinder for engagement by the flange of said thimble to tilt the valve off its seat, the first movement of the piston on its pressure stroke serving to move the thimble and permit the valve to right itself to seal the opening between the reservoir and cylinder.

6. In a combined master cylinder and reservoir, a piston including a cup washer in the cylinder, there being an opening between the reservoir and the cylinder beyond the pressure stroke of the piston, a member abutting the piston and movable in the cylinder in contact with the piston, a return spring abutting said member to move the member and the piston toward their normal positions, the member having an abutment remote from but facing the piston which moves beyond the opening between the cylinder and the reservoir on the pressure stroke of the piston, a tiltable valve having a stem extending into the cylinder in position to be engaged by said abutment to tilt the valve when the piston and member are in their normal positions, the movement of the abutment on the first pressure stroke of the piston permitting the valve to be untilted to close the opening from the cylinder to the reservoir, and a spring for seating said valve, the return spring for the piston being of greater strength than the valve spring.

LUDGER E. LA BRIE.

REFERENCES CITED

The following references are of record in the file of this patent:

UNITED STATES PATENTS

| Number | Name | Date |
|---|---|---|
| 1,786,912 | Madden | Dec. 30, 1930 |
| 1,833,438 | Schjolin | Nov. 24, 1931 |
| 2,000,187 | Oliver | May 7, 1935 |
| 2,152,485 | Kindl | Mar. 28, 1939 |
| 2,163,874 | Goepfrich | June 27, 1939 |
| 2,258,257 | Main | Oct. 7, 1941 |
| 2,299,599 | Shultz | Oct. 20, 1942 |
| 2,314,553 | Palm | Mar. 23, 1943 |

FOREIGN PATENTS

| Number | Country | Date |
|---|---|---|
| 539,095 | Great Britain | Aug. 27, 1941 |